Jan. 6, 1959　　　R. H. BOLSTER　　　2,867,126
TRANSMISSION
Filed Aug. 31, 1956　　　　　　　　　3 Sheets-Sheet 1
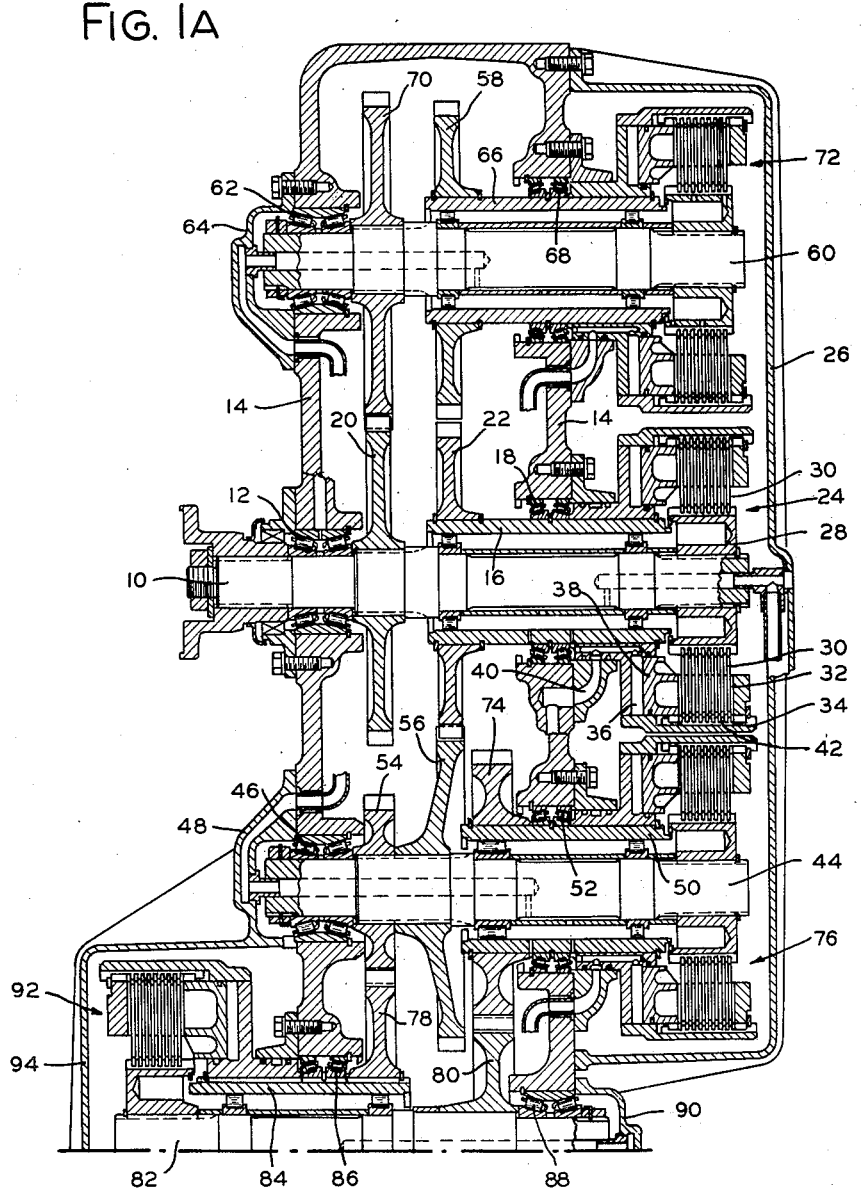
FIG. IA
INVENTOR.
RONALD H. BOLSTER
BY
ATTYS.

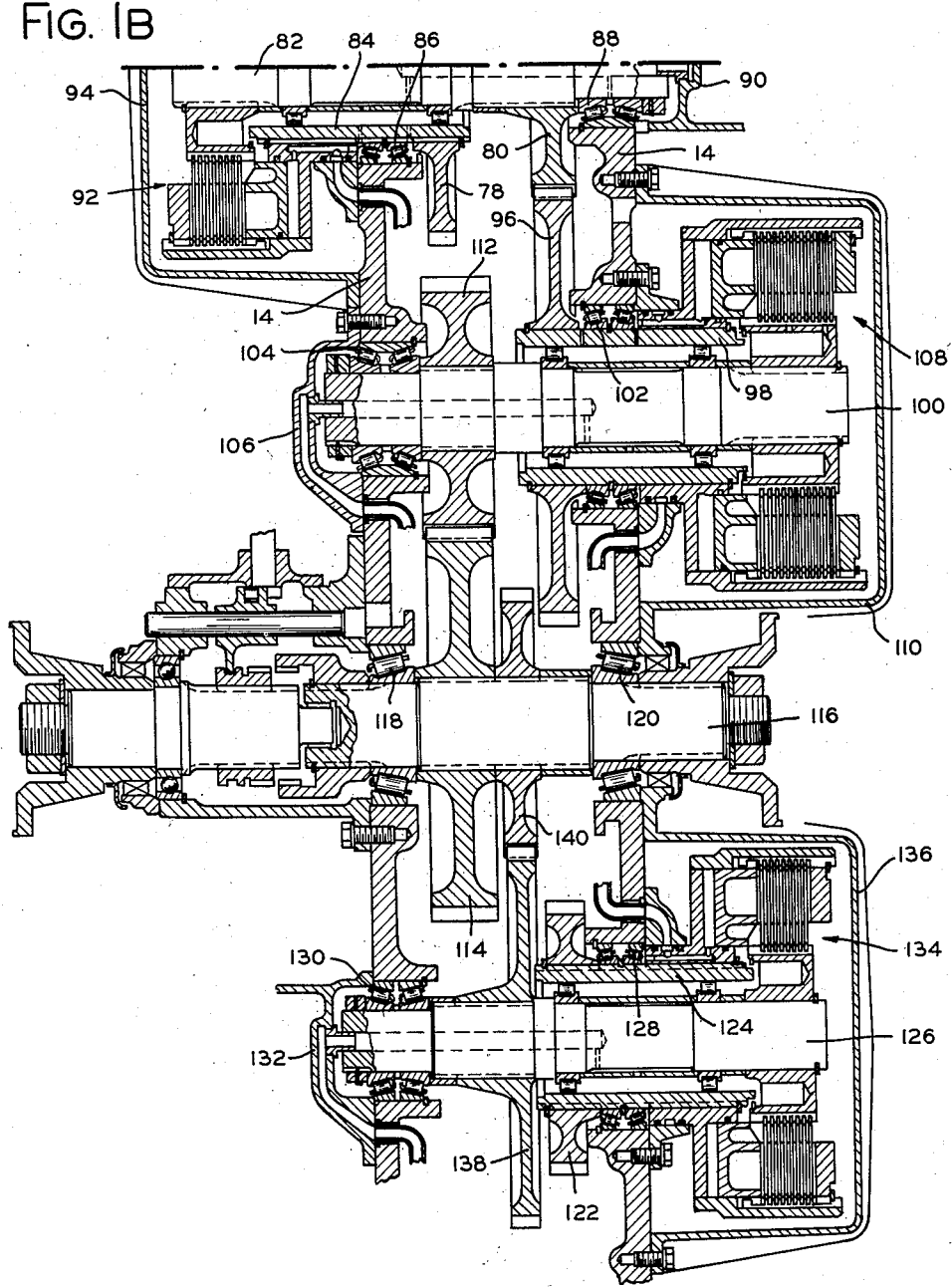

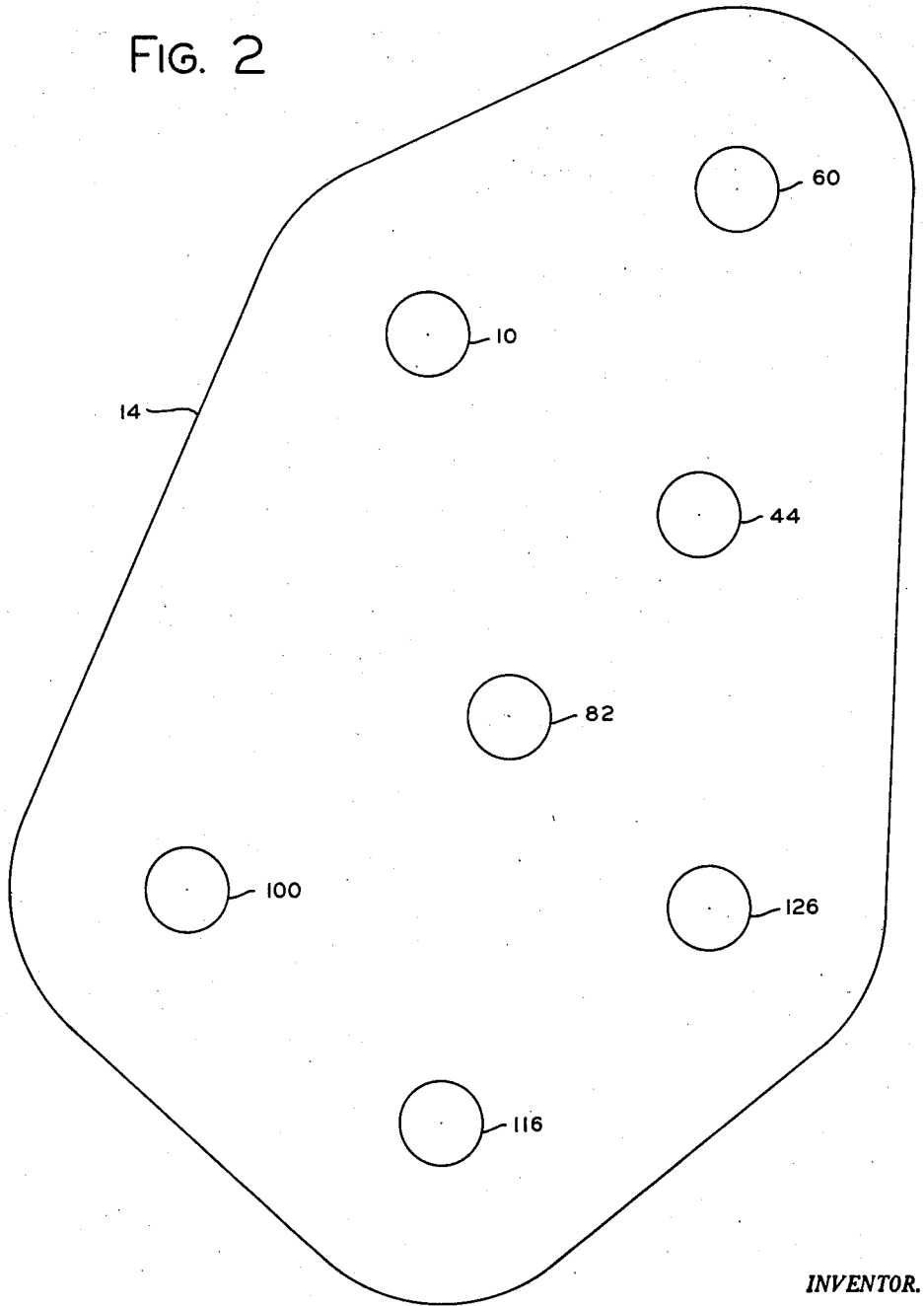

United States Patent Office 2,867,126
Patented Jan. 6, 1959

2,867,126

TRANSMISSION

Ronald H. Bolster, Jackson, Mich., assignor to Clark Equipment Company, a corporation of Michigan Application August 31, 1956, Serial No. 607,470

6 Claims. (Cl. 74—360)

The present invention relates to transmissions for trucks, tractors and like heavy duty vehicles and more specifically to transmissions having multiple forward and reverse drive speeds.

A primary object of the invention is to provide a transmission having multiple forward and reverse drive speeds wherein changes in direction of drive and speed ratios may be smoothly and effectively accomplished.

Another object of the invention is to provide a transmission having multiple forward and reverse drive speeds in which the transmission gears are continuously in mesh and drive at different speed ratios and direction is selectively effected by fluid or power actuation of friction clutches whereby required changes in drive direction and speed ratios may be smoothly and quickly effected.

A further object of the invention is to provide a transmission with primary drive means and reverse drive means continuously in mesh so as to be simultaneously driven and wherein each of the drive means may be selectively brought into driving relation with a common multi-speed gear means.

In the accomplishment of the foregoing objects, the present invention contemplates a transmission having an input shaft which continuously drives a reverse shaft and each of which shafts has a rotatable drive gear which continuously meshes with a common torque transmitting gear on a first countershaft arranged parallel to said input and reverse shafts and each of which input and reverse shafts have clutch means which may be selectively operated to clutch a respective one of said drive gears with the shaft on which it rotates to drive the common torque transmitting gear in forward or reverse direction. Rotation of said common torque transmitting gear serves to rotate a second torque transmitting gear on said first countershaft to drive a third torque transmitting gear rotatable about a second countershaft and clutchable thereto. Said first countershaft has a fourth torque transmitting gear rotatable thereon and which may be clutched to the first countershaft to drive a fifth torque transmitting gear on the second countershaft. By selective operation of the clutches on the first and second countershafts, the second countershaft may be selectively driven at two different speed ratios. The mentioned fifth torque transmitting gear on said second countershaft meshes with a sixth and a seventh torque transmitting gear which are, respectively, rotatable about third and fourth countershafts. Said third and fourth countershafts are geared to drive, when rotated, the output shaft and said third and fourth countershafts each have clutch means which may be selectively operated to clutch either the sixth gear to the third countershaft or the seventh gear to the fourth countershaft. By virtue of this construction, through the suitable operation of one each of three pairs of clutches a choice of four speeds in reverse and four speeds in forward may be obtained. The first pair of clutches select forward and reverse drive direction. The second pair on the first and second countershafts give a choice of two speed reductions while the final pair of clutches on the third and fourth countershafts give another choice of two speed reductions in series with the first two. Thus four ratios are provided in forward and reverse.

A feature of transmissions according to the present invention is that all the heavy elements, such as the clutch drums, run at engine speed or lower, and although it is necessary in certain speed ratios that some of the gears operate at higher than engine speed, it is contemplated that all of such gears will be of relatively small mass.

Other objects of the invention are to provide a transmission accomplishing all of the aforesaid objects and advantages and which is further of rugged and economical compact construction. Thus, it is also a further feature of the invention that the several clutch mechanisms are arranged on the ends of the respective shafts outside the main transmission housing for convenient access and that the entire construction is adapted to facilitate assembly and servicing.

Many other objects as well as advantages and features of the invention are apparent or will become evident from the description of a preferred embodiment of the invention which follows when taken with the several views in the accompanying drawings.

Now referring to the drawings:

Figure 1A is a sectional view of a transmission according to the present invention with the transmission shafts being shown revolved out of their normal position and in a common plane for sake of clarity.

Figure 1B is a continuation of Figure 1A; and

Figure 2 is a diagrammatic end view of the transmission of Figure 1 and shows the geometric arrangement of the shafts.

Referring now to the drawings, there is indicated at 10 the input shaft of a preferred embodiment of a transmission according to the present invention. Said input shaft 10 is adapted to have suitable connection at one end with a main friction disc clutch, or a fluid torque converter driven by a prime mover such as an internal combustion engine. The input shaft is shown journalled in tapered roller bearing assemblies 12 which are suitably arranged within the forward end wall of the transmission housing 14 and said shaft 10 has its opposite end extending through the rear end wall of said housing 14.

A sleeve member 16 is suitably journalled about said opposite end of the input shaft 10 and within tapered roller bearing assemblies 18 arranged in said rear end wall of said transmission housing 14 to provide further rotatable support for said input shaft 10. Suitably splined to said input shaft 10 is an intermediate gear 20 and suitably splined to sleeve member 16 is a primary drive gear 22, both of which gears are located between the forward and rear end walls of the housing 14. Clutch means indicated generally at 24 is disposed about the part of said end of the input shaft 10 which extends through the rear end wall of the housing 14 and is adapted for clutching sleeve member 16 to the input shaft 10 so as to clutch primary drive gear 22 to said shaft 10. A cover 26 detachably connected to said rear end wall of the transmission housing 14 serves to enclose said clutch means 24 and end of the input shaft 10.

To accomplish the aforesaid function, the clutch means 24 comprises an inner clutch hub 28 which is suitably keyed and affixed to the said rear end of shaft 10. The outer periphery of said clutch hub 28 is splined, and arranged for axial movement along these splines are a plurality of annular clutch discs 30. Said discs 30 are arranged alternately with respect to annular clutch discs 32 which at their outer peripheries are splined for axial movement along the internal splines formed within the clutch hub 34 which is suitably splined to sleeve 16. The interior of clutch hub 34 defines an annular fluid chamber 36 in which is mounted for axial movement an annular piston 38. Fluid under pressure is adapted to be selectively admitted to said chamber 36 through a fluid passageway indicated generally at 40, and which is placed in communication with a source of fluid under pressure through suitable control valve means not shown, since it does not form part of the present invention.

Admission of fluid under pressure through passageway 40 into chamber 36 serves to urge piston 38 to the right as viewed in Figure 1A, thereby urging the clutch discs 30 and 32 into clutching engagement, whereupon the gear 22 and sleeve member 16 are clutched to the input shaft 10 for conjoint rotation therewith. Gear 22 may be declutched from input shaft 10 by bleeding the fluid under pressure from the chamber 36 so as to permit coil spring assemblies 42 to spread the clutch discs 30 and 32 apart.

Arranged to one side of a vertical median line passing through the axis of the input shaft 10 and below said input shaft is a first countershaft 44 arranged parallel therewith. Said first countershaft 44 has its forward end journalled in tapered roller bearing assemblies 46 retained in the forward end wall of the transmission housing 14 and is capped by a removable cover 48. Its rear end extends through the rear end wall of said housing 14 and is journalled in a cylindrical sleeve member 50 which in turn is journalled in tapered roller bearing assemblies 52 retained in said rear end wall of the transmission housing 14. Splined to said first countershaft 44 between said forward and rear end walls of the transmission housing are a pair of torque transmitting gears 54 and 56 of different diameter and number of teeth. The larger gear 56 with the greater number of teeth has meshing engagement with the primary drive gear 22 and is adapted to be driven thereby for establishing forward drive when the clutch means 24 is engaged.

Torque transmitting gear 56 is also in meshing engagement with reverse drive gear 58 and is adapted to be driven in reverse drive direction thereby. To accomplish this, a reverse drive shaft 60 is disposed in parallel with the input shaft 10 above both the input shaft 10 and the first countershaft 44 somewhat to the right of a vertical median line passing through the axis of shaft 44, as viewed in Figure 2. Reverse drive shaft 60 has its forward end journalled in tapered roller bearing assemblies 62 retained in the front end wall of the housing and is enclosed by a removable cover 64. The rear end of said reverse shaft 60 extends through the rear end wall of said housing 14 and is journalled in cylindrical sleeve 66 which in turn is journalled in tapered roller bearing assemblies 68 retained in the rear end wall of the transmission housing. An intermediate gear 70 is splined to said reverse drive shaft 60 and meshes with gear 20 secured to the input shaft 10 so that shaft 60 is adapted to be continuously and simultaneously driven in reverse direction with rotation of input shaft 10. Both the intermediate gear 70 and the aforementioned reverse drive gear 58 are located between the front and rear end wall of the transmission housing, reverse drive gear 58 being splined to sleeve 66 which extends through the rear end wall of housing 14 and is adapted to be clutched to reverse drive shaft 60 for conjoint rotation by operation of reverse drive fluid actuated disc clutch means indicated generally at 72 and which is mounted about the rear end of shaft 60 and enclosed by cover 26. The reverse drive clutch means 72 is of the same construction, and operates in the same manner as clutch means 24 described in detail hereinbefore, and it is believed that a full description of clutch means 72 is unnecessary for purposes of the present disclosure.

From the foregoing description, it will be seen that one of the features of a transmission according to the present invention is that both the input and reverse drive shafts are adapted to be continuously and simultaneously driven, and that each has a drive gear rotatable thereabout which meshes with a common torque transmitting gear 56 and may be clutched to its respective shaft 10 or 60 by engagement of a respectively associated clutch means 24 or 72. Thus, by engagement of clutch means 24 with clutch 72 disengaged, primary drive gear 22 may be operated to drive torque transmitting gear 56 in a forward direction while by engagement of clutch means 72 and disengagement of clutch 72, the reverse drive gear 58 may be operated to drive torque transmitting gear 56 in reverse.

The multi-speed gear means driven by torque transmitting gear 56 includes in addition to the previously mentioned gear 54 a third torque transmitting gear 74 also located in the space between the front and rear end walls of the housing 14 and is splined to the mentioned sleeve 50 so as to rotate therewith about countershaft 44. It is adapted to be clutched to countershaft 44 for conjoint rotation therewith by engagement of clutch means 76 which is mounted about the rear end of shaft 44 and enclosed by cover 26. Clutch means 76 is identical in construction and operation to the clutch means 24 described hereinbefore.

Torque transmitting gears 54 and 74 are arranged in meshing engagement with fourth and fifth torque transmitting gears 78 and 80, respectively, and which are of different diameter and have different numbers of teeth. Gear 80 is splined to countershaft 82 and gear 78 to cylinder sleeve 84 which, as shown in Figures 1A and 1B is journalled about the forward end of countershaft 82 and within tapered roller bearing assemblies 86 retained in the forward end wall of housing 14, its forward end extending through said forward wall and having clutch means 92 mounted thereabout. The rear end of said second countershaft 82 is journalled in roller bearing assemblies 88 which are retained in the rear end wall of housing 14 and enclosed by removable cap 90. As viewed in Figure 2, coutnershaft 82 is conveniently located below countershaft 44 intermediate vertical median lines passing through the axes of said countershaft 44 and input shaft 10 in parallel with said two shafts. Gear 78 splined to sleeve 84 is adapted to be clutched to countershaft 82 for conjoint rotation by engagement of the clutch means 92 mounted on the forward end of countershaft 82 outside the transmission housing 14 and enclosed by removable cover 94. The construction and operation of clutch means 92 is identical with that of the previously described clutch means 24.

By the aforesaid construction, countershaft 82 is adapted to be driven in either forward or reverse direction by selective engagement of clutch means 24 and 72 and in a choice of two drive ranges relative to the input shaft in accordance with whether clutch means 76 or 92 is engaged. Engagement of clutch means 76, for example, serves to drive countershaft 82 through meshing gears 74 and 78 at one speed ratio while engagement of clutch means 92 will drive it through gears 54 and 78 at a slower speed.

Continuing on Figure 1B, the embodiment of the invention being described is seen to further include a torque transmitting gear 96 which meshes with the gear 80 previously described as splined to countershaft 82 so as to be driven thereby. Gear 96 is, in turn, splined to sleeve 98 which is journalled about a third countershaft 100 and within tapered roller bearing assembly 102 retained in the rear end wall of the housing 14. The other or forward end of countershaft 100 is journalled in tapered roller bearing assemblies 104 retained in the front end wall of said housing 14 and is capped by removable cover 106. As viewed in Figure 2, countershaft 100 is arranged parallel with respect to the second countershaft 44 and below and to the left thereof. On the outer side of the rear end wall of housing 14 and about the rear end of countershaft 100 is a fluid actuated clutch means 108 also enclosed by a suitable removable cover 110. The construction and operation of clutch means 108 is identical to that of the previously described clutch means 24 and when engaged operates to clutch gear 96 to countershaft 100 for conjoint rotation therewith. In the space between the front and rear end walls of the transmission housing 14, an intermediate gear 112 is splined or otherwise secured to countershaft 100 in adjacent relation with gear 96 and meshes with gear 114 splined to the output shaft 116 to drive shaft 116 when gear 96 is clutched by means 108 to countershaft 100.

Output shaft 116 is suitably journalled in tapered roller bearing assemblies 118 and 120 retained in the forward and rear end walls of the transmission housing and have one or both ends extending outwardly and beyond said transmission walls and are adapted for connection in known manner with the drive axle of the vehicle in which the transmission of the present invention is located. As will be seen in Figure 2, preferably said output shaft 116 is disposed parallel to the input shaft 10 and in the vertical median line passing through the axis thereof and below countershaft 100 and to the right thereof.

Torque transmitting gear 80 on countershaft 82 also meshes with a further torque transmitting gear 122 which is splined to sleeve member 124 for rotation therewith about countershaft 126. For this purpose, countershaft 126 is also parallel with countershaft 82 but spaced therebelow and to the right of shaft 82. Like the mounting of the other countershafts, the sleeve member 124 in which the rear end of countershaft 126 is journalled is itself journalled within tapered roller bearing assemblies 128 retained in the rear end wall of the transmission housing 15. The opposed or forward end of countershaft 126 is journalled in tapered roller bearing assemblies 130 retained in the forward wall of said housing and is enclosed by a removable cap or cover 132. Torque transmitting gear is adapted to be clutched to said countershaft 126 by engagement of fluid actuated friction clutch means 134 which is mounted about the rear end of shaft 126 outside the transmission housing 14 and is enclosed by a removable cover 136. Clutch means 134 is identical in construction and operation to clutch means 24 previously described hereinbefore.

An intermediate gear 138 is splined to countershaft 126 and meshes with a gear 140 splined to the output shaft 116. Gears 122, 138 and 140 are selected to have different diameters and number of teeth than gears 96, 112 and 114, so that by selective engagement of either clutch means 134 or 108 and disengagement of the other clutch means, two drive ranges of different speed ratio may be introduced between countershaft 82 and the output shaft 116 which will be in series with a selected one of the two possible drive ranges introduced on countershaft 82 by selective engagement of clutch means 92 and 76 and disengagement of the other as discussed above.

Thus it will be apparent that by selective engagement of clutch means 76 or 92 with disengagement of the other and selective engagement of one of the second pair of clutch means 108 and 134 and disengagement of the other, that the output shaft 116 may be driven in any one of four selective speeds. Furthermore, by selective actuation of clutch means 24 or 72 and disengagement of the other, the output shaft 116 may be driven at any one of said four speeds in either forward or reverse direction. Moreover, it will be apparent that the changeover in direction of drive and speed ratio may be accomplished smoothly and quickly because of the employment of fluid actuated friction disc clutch means throughout.

In order to obtain compactness and convenience in assembly and/or servicing, all of the gears are arranged between the front and rear end walls of the transmission housing, with the shafts of the transmission in offset relation so that the gearing occupies a minimum of space. Moreover, each of the six clutch means have been conveniently located on the ends of the transmission shafts exteriorly of the forward and rear end walls of the transmission housing. Further, the six clutch means have been equally distributed so that there is one friction clutch means per shaft with the exception of the output shaft.

Thus it will be apparent that all of the objects and advantages of the invention have been demonstrated as obtainable in a convenient, simple and practical manner. Furthermore, while a preferred embodiment of the invention has herein been described, it will be understood that various rearrangements and modifications may be made therein without departing from the spirit and scope of the invention as defined in the appended claims.

Now having described my invention, I claim:

1. A transmission comprising an input shaft and a reverse drive shaft in spaced parallel relation and so connected as to be simultaneously and continuously driven by rotation of the input shaft, a first drive gear rotatable about the input shaft, a second drive gear rotatable about the reverse drive shaft, a first clutch means for clutching the first drive gear to the input shaft, a second clutch means for clutching the second drive gear to the reverse drive shaft, a countershaft, a torque transmitting gear secured to said countershaft and continuously meshing with said first and second drive gears so as to be driven in one direction when the first clutch means is engaged and to be driven in the opposite direction when the second clutch means is engaged, an output shaft, and multispeed gear means drivingly associated with said torque transmitting gear and said output shaft whereby the latter may be driven in either direction in any one of several speeds.

2. A transmission comprising an input shaft, a first countershaft, a first torque transmitting gear secured to said first countershaft, and gear means operable by said input shaft to drive said first torque transmitting gear, a second torque transmitting gear secured to said first countershaft, a third torque transmitting gear rotatable about said first countershaft and a first clutch means for clutching said third torque transmitting gear to said first countershaft, a second countershaft, a fourth torque transmitting gear secured to said second countershaft and meshing with said third torque transmitting gear, a fifth torque transmitting gear rotatable about said second countershaft and meshing with said second torque transmitting gear, and a second clutch means for clutching said fifth torque transmitting gear to said second countershaft, third and fourth countershafts, a sixth torque transmitting gear rotatable about said third countershaft, a seventh torque transmitting gear rotatable about said fourth countershaft, said sixth and seventh torque transmitting gears meshing with said fourth torque transmitting gear, and further clutch means for selectively clutching said sixth torque transmitting gear to said third countershaft or the seventh torque transmitting gear to the fourth countershaft, and an output shaft having gear means secured thereto and meshing with a gear secured to the third countershaft and meshing with a gear secured to the fourth countershaft whereby the output shaft may be driven at different speeds by selective engagement of said clutch means.

3. A transmission comprising an input shaft, a first countershaft, a first torque transmitting gear secured to said first countershaft; a primary drive gear rotatable about said input shaft and meshing with said first torque transmitting gear, and a first clutch means for clutching said primary drive gear to the input shaft, a second torque transmitting gear secured to said first countershaft, a third torque transmitting gear rotatable about said first countershaft and a second clutch means for clutching said third torque transmitting gear to said first countershaft, a second countershaft, a fourth torque transmitting gear secured to said second countershaft and meshing with said third torque transmitting gear, a fifth torque transmitting gear rotatable about said second countershaft and meshing with said second torque transmitting gear, and a third clutch means for clutching said fifth torque transmitting gear to said second countershaft, third and fourth countershafts, a sixth torque transmitting gear rotatable about said third countershaft, a seventh torque transmitting gear rotatable about said fourth countershaft, said sixth and seventh torque transmitting gears meshing with said fourth torque transmitting gear, a fourth clutch means for clutching said sixth torque transmitting gear to said third countershaft and a fifth clutch means for clutching the seventh torque transmitting gear to the fourth countershaft, and an output shaft having a first gear means secured thereto and meshing with a second gear secured to the third countershaft and a third gear secured to said output shaft meshing with a fourth gear secured to the fourth countershaft whereby the output shaft may be driven at different speeds by selective engagement of the clutch means.

4. A transmission comprising an input shaft and a reverse drive shaft adapted to be simultaneously driven by rotation of the input shaft, a first drive gear rotatable about the input shaft, a second drive gear rotatable about the reverse drive shaft, a first clutch means for clutching the first drive gear to the input shaft, a second clutch means for clutching the second drive gear to the reverse drive shaft, a first countershaft, a first torque transmitting gear secured to said countershaft and continuously meshing with said first and second drive gears so as to be driven in one direction when the first clutch means is engaged and to be driven in the opposite direction when the second clutch means is engaged, a second torque transmitting gear secured to said first countershaft, a third torque transmitting gear rotatable about said first countershaft and a third clutch means for clutching said third torque transmitting gear to said first countershaft, a second countershaft, a fourth torque transmitting gear secured to said second countershaft and meshing with said third torque transmitting gear, a fifth torque transmitting gear rotatable about said second countershaft and meshing with said second torque transmitting gear, and a fourth clutch means for clutching said fifth torque transmitting gear to said second countershaft, third and fourth countershafts, a sixth torque transmitting gear rotatable about said third countershaft, a seventh torque transmitting gear rotatable about said fourth countershaft, said sixth and seventh torque transmitting gears meshing with said fourth torque transmitting gear, a fifth clutch means for clutching said sixth torque transmitting gear to said third countershaft and a sixth clutch means for clutching the seventh torque transmitting gear to the fourth countershaft, and an output shaft having gear means secured thereto and meshing with a gear secured to the third countershaft and a gear secured to the fourth countershaft whereby the output shaft may be driven in either direction in any one of several different speeds by selective engagement of the clutch means.

5. A transmission comprising an input shaft and a reverse drive shaft, intermeshing gears on each of said shafts whereby the latter will be simultaneously driven by rotation of the input shaft, a primary drive gear rotatable about the input shaft, a reverse drive gear rotatable about the reverse drive shaft, a first clutch means for clutching the primary drive gear to the input shaft, a second clutch means for clutching the reverse drive gear to the reverse drive shaft, a countershaft, a torque transmitting gear secured to said countershaft and continuously meshing with said primary and reverse drive gears so as to be driven in forward direction when the first clutch means is engaged and to be driven in reverse direction when the second clutch means is engaged, a second torque transmitting gear secured to said first countershaft, a third torque transmitting gear rotatable about said first countershaft and a third clutch means for clutching said third torque transmitting gear to said first countershaft, a second countershaft, a fourth torque transmitting gear secured to said second countershaft and meshing with said third torque transmitting gear, a fifth torque transmitting gear rotatable about said second countershaft and meshing with said second torque transmitting gear, a fourth clutch means for clutching said fifth torque transmitting gear to said second countershaft, third and fourth countershafts, a sixth torque transmitting gear rotatable about said third countershaft, a seventh torque transmitting gear rotatable about said fourth countershaft, said sixth and seventh torque transmitting gears meshing with said fourth torque transmitting gear, a fifth clutch means for clutching said sixth torque transmitting gear to said third countershaft, a sixth clutch means for clutching the seventh torque transmitting gear to the fourth countershaft, an output shaft, a first gear means secured to said output shaft, a second gear secured to the third countershaft and meshing with said first gear, a third gear secured to said output shaft and a fourth gear secured to the fourth countershaft and meshing with said third gear whereby the output shaft may be driven in forward and reverse direction in one of several possible speeds by selective engagement of the clutch means.

6. A transmission having an input shaft and a reverse shaft continuously driven in reverse by said input shaft, a pair of drive gears, one being rotatable about the input shaft and the other about the reverse shaft, a common torque transmitting gear continuously meshing with said pair of drive gears and mounted on a first countershaft rotatably arranged parallel to said input and reverse shafts, clutch means selectively operable to clutch a respective one of said drive gears with the shaft on which it rotates to drive the common torque transmitting gear in forward or reverse directions, a second torque transmitting gear rotatable by rotation of said common torque transmitting gear, a third torque transmitting gear driven by said second torque transmitting gear, said third torque transmitting gear being rotatable about a second countershaft and clutchable thereto, a fourth torque transmitting gear rotatable on said first countershaft and clutchable thereto, a fifth torque transmitting gear driven by said fourth torque transmitting gear to rotate said second countershaft, clutch means for selectively clutching said third and fourth torque transmitting gears to their respective shafts and disengaging the other to drive said second countershaft, a sixth torque transmitting gear rotatable about a third countershaft and clutchable thereto, a seventh torque transmitting gear rotatable about a fourth countershaft and clutchable thereto, said sixth and seventh torque transmitting gears being driven by rotation of said second countershaft, an output shaft adapted to be driven by rotation of said third or fourth countershafts, and clutch means for selectively clutching said sixth and seventh torque transmitting gears to said respective third and fourth countershafts and disengaging the other whereby said output shaft may be driven in either direction and at different speeds by selective engagement of said several clutch means.

References Cited in the file of this patent
UNITED STATES PATENTS
2,158,320   Bock _____ May 16, 1939